United States Patent
Won

(10) Patent No.: US 10,904,247 B2
(45) Date of Patent: Jan. 26, 2021

(54) SERVER FOR AUTHENTICATION BASED ON CONTEXT INFORMATION OF PARTICULAR LOCATION, CONTROL METHOD THEREOF AND ELECTRONIC APPARATUS

(71) Applicant: SAMSUNG ELECTRONICS CO., LTD., Suwon-si (KR)

(72) Inventor: Jong-se Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 15/455,471

(22) Filed: Mar. 10, 2017

(65) Prior Publication Data
US 2017/0264609 A1    Sep. 14, 2017

(30) Foreign Application Priority Data
Mar. 10, 2016    (KR) .................. 10-2016-0028752

(51) Int. Cl.
*H04L 29/06* (2006.01)
*H04W 12/00* (2009.01)

(52) U.S. Cl.
CPC ... *H04L 63/0876* (2013.01); *H04W 12/00503* (2019.01)

(58) Field of Classification Search
None
See application file for complete search history.

(56) References Cited

U.S. PATENT DOCUMENTS

| | | | | |
|---|---|---|---|---|
| 2006/0047606 A1* | 3/2006 | Yach | ........ | G06F 21/42 705/76 |
| 2013/0269013 A1* | 10/2013 | Parry | ........ | G06K 9/00892 726/7 |
| 2016/0182500 A1* | 6/2016 | Ligatti | ........ | H04L 63/0407 713/156 |
| 2017/0124312 A1* | 5/2017 | Inoue | ........ | G06F 21/32 |
| 2017/0169435 A1* | 6/2017 | O'Regan | ........ | G06Q 20/40145 |
| 2017/0169735 A1* | 6/2017 | Lablans | ........ | H04L 9/3013 |

FOREIGN PATENT DOCUMENTS

| | | |
|---|---|---|
| KR | 10-2005-0049569 | 5/2005 |
| KR | 10-1328993 | 11/2013 |

OTHER PUBLICATIONS

Nossier et al., Question-Based Authentication Using Context Data, 2006, NordiCHI 2006: Changing roles, Oct. 14-18, 2006, Oslo Norway, pp. 429-432 (Year: 2006).*
Renaud et al., Question-Based Group Authentication, 2006, OZCHI, Nov. 20-24, 2006, Sydney, Australia, pp. 277-283 (Year: 2006).*

* cited by examiner

*Primary Examiner* — Luu T Pham
*Assistant Examiner* — Edward X Long
(74) *Attorney, Agent, or Firm* — Nixon & Vanderhye P.C.

(57) ABSTRACT

A server, a control method thereof, and an electronic apparatus are provided. The method of operating a server may include: transmitting question information to a first user terminal in response to receiving an authentication request from the first user terminal; receiving first response information in response to the question information from the first user terminal; transmitting the question information and first response information received from the first user terminal to an electronic apparatus; and determining whether the first user terminal is authenticated based on a confirmation result for the first response information being received from the electronic apparatus.

5 Claims, 11 Drawing Sheets

1000

SERVER FOR AUTHENTICATION BASED ON CONTEXT INFORMATION OF PARTICULAR LOCATION, CONTROL METHOD THEREOF AND ELECTRONIC APPARATUS

CROSS-REFERENCE TO RELATED APPLICATION

This application is based on and claims priority under 35 U.S.C. § 119 to Korean Patent Application No. 10-2016-0028752, filed on Mar. 10, 2016 in the Korean Intellectual Property Office the disclosure of which is incorporated by reference herein in its entirety.

BACKGROUND

Field

The present disclosure relates generally to a server, a control method thereof, and an electronic apparatus, and for example, to a server for determining whether or not a user terminal is authenticated based on response information received from the user terminal and response information received from the electronic apparatus, a control method thereof, and an electronic apparatus.

Description of Related Art

Most existing technologies use personal information for authentication. Since the technologies for utilizing personal information are often based on unique information of the person himself, such as a resident registration number, a public certificate, a unique value (for example, MAC address) of an apparatus, and a mobile phone number, it is not easy to newly issue or change the unique information even if the unique information is exposed to others.

Further, even if the unique information is newly issued or changed, there is inconvenience of correcting other matters using the existing shared information as an authentication means.

Accordingly, there is a need for an authentication means which is less likely to be exposed and which is easy to change even if it is exposed.

SUMMARY

Example embodiments of the present disclosure address the above disadvantages and other disadvantages not described above.

The present disclosure provides a server for determining whether or not a user terminal or a user is authenticated based on a confirmation result for response information received from the user terminal and response information received from a display device, and a control method thereof.

According to an example aspect of the present disclosure, a method of operating a server in an electronic apparatus includes: transmitting question information to a first user terminal if an authentication request is received from the first user terminal; transmitting the question information and first response information to an external electronic apparatus if the first user terminal transmits the first response information in response to the question information; and determining whether the first user terminal is authenticated based on a confirmation result, if the confirmation result for the first response information is received from the electronic apparatus.

The method of operating a server may further include: transmitting the question information and second response information to the electronic apparatus if the question information and the second response information for registration of an authentication means are received from the first user terminal; and storing the second response information as a correct answer if a determination result that the second response information corresponds to the question information is received from the electronic apparatus.

The determining whether the user terminal is authenticated may include: determining whether the first response information matches the stored correct answer if the confirmation result is matched; and determining that the first user terminal is authenticated if the first response information matches the stored correct answer.

The method of operating a server may further include: transmitting question information to a second user terminal if an authentication request is received from the second user terminal; and transmitting the question information and third response information to the electronic apparatus if the second user terminal transmits the third response information in response to the question information, in which the question information may be the question information received from the first user terminal.

The method of operating a server may further include: transmitting whether the second user terminal is authenticated to the first user terminal.

The confirmation result received from the electronic apparatus may be a result of acquiring fourth response information on the question information using at least one of an image acquired by the electronic apparatus and an image pre-stored in the electronic apparatus and confirming whether the fourth response information matches the first response information.

According to another example aspect of the present disclosure, a server includes: a communicator comprising communication circuitry configured to transmit question information to a first user terminal if an authentication request is received from the first user terminal and to transmit the question information and first response information to an external electronic apparatus if the first response information responding to the question information is received from the first user terminal; and a processor configured to determine whether the first user terminal is authenticated based on a confirmation result if the confirmation result for the first response information is received from the electronic apparatus through the communicator.

The server may further include: a storage, in which the processor may control the communicator to transmit the question information and second response information to the electronic apparatus if the question information and the second response information for registration of an authentication means are received from the first user terminal; and may store the second response information in the storage as a correct answer if a determination result that the second response information corresponds to the question information is received from the electronic apparatus through the communicator.

The processor may determine whether the first response information matches the stored correct answer if the confirmation result is matched and may determine that the first user terminal is authenticated if the first response information matches the stored correct answer.

The processor may transmit question information to a second user terminal if an authentication request is received from the second user terminal through the communicator and may control the communicator to transmit the question information and third response information to the electronic apparatus if the third response information responding to the question information is received from the second user terminal through the communicator, and the question information may be the question information received from the first user terminal.

The processor may control the communicator to transmit whether the second user terminal is authenticated to the first user terminal.

The confirmation result received from the electronic apparatus may be a result of acquiring fourth response information on the question information using at least one of an image acquired by the electronic apparatus and an image pre-stored in the electronic apparatus and confirming whether the fourth response information matches the first response information.

According to still another example aspect of the present disclosure, a method of controlling an electronic apparatus includes: receiving questing information and first response information for authenticating a first user terminal from a server if the first user terminal requests authentication to the server; acquiring context information of a location where the electronic apparatus is located using an image; acquiring second response information on the question information using the acquired context information and determining a confirmation result for the first response information based on the acquired second response information; and transmitting the determined confirmation result to the server.

As described above, according to various example embodiments of the present disclosure, it is possible to provide the authentication service that may be authenticated by reflecting the situation of the location hardly exposed to others, and may be easily changed when exposed.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
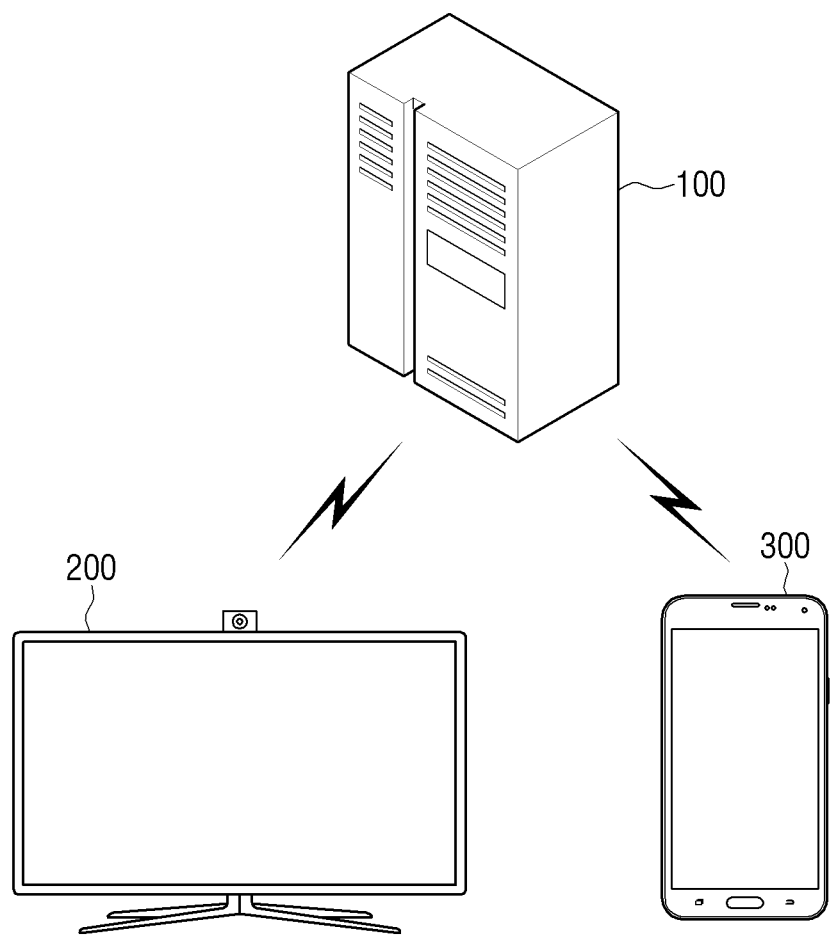
FIG. 1 is a diagram illustrating an example authentication system according to an example embodiment of the present disclosure.

Terms used in the description of the various example embodiments of the present disclosure are briefly described and then the various example embodiments of the present disclosure will be described in greater detail.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Therefore, terms used in the present disclosure may be defined based on a meaning of the terms and contents described in the present disclosure, not simply based on names of the terms.

In the present disclosure, terms including an ordinal number such as 'first', 'second', etc. may be used to describe various components, but the components are not to be construed as being limited to the terms. The terms are only used to differentiate one component from other components. For example, the 'first' component may be named the 'second' component, and vice versa, without departing from the scope of the present disclosure. The term 'and/or' includes a combination of a plurality of items or any one of a plurality of terms.

Further, in the present disclosure, singular forms used in the specification are intended to include plural forms unless the context clearly indicates otherwise.

Further, it will be further understood that the terms "comprises" or "have" used in the present disclosure, specify the presence of stated features, numerals, steps, operations, components, parts mentioned in this specification, or a combination thereof, but do not preclude the presence or addition of one or more other features, numerals, steps, operations, components, parts, or a combination thereof.

Further, in the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

Further, in the present disclosure, a case in which any one part is connected with the other part includes a case in which the parts are directly connected with each other and a case in which the parts are electrically connected with each other with other elements interposed therebetween.

Further, in the present disclosure, an input, e.g., a user input, may include at least one of a touch input, a bending input, a speech input, a button input, and a multimodal input, but is not limited thereto.

Further, in the present disclosure, "application" may refer, for example, to a set of computer programs designed to perform a specific task. In the example embodiments of the present disclosure, the application may be diverse. An example of the application may include game application, moving picture playing application, map application, memo application, calendar application, phone book application, broadcasting application, exercise support application, settlement application, picture folder application, etc., but the application is not limited thereto.

Unless indicated otherwise, it is to be understood that all the terms used in the disclosure including technical and scientific terms has the same meaning as those that are understood by those who skilled in the art. It is to be understood that the terms defined by the dictionary generally used are the same or similar to the meanings within the context of the related art, and they should not be ideally or excessively formally defined unless explicitly defined herein.

Hereinafter, the present disclosure will be described in greater detail with reference to the accompanying drawings.

FIG. 1 is a diagram illustrating an example system according to an example embodiment of the present disclosure. As illustrated in FIG. 1, a system 1000 includes a server 100, an electronic apparatus 200, and a user terminal 300. Here, the electronic apparatus may be implemented as a smart TV, which is only example. Therefore the electronic apparatus may be implemented as various electronic apparatuses such as, for example, and without limitation, a smart phone, a desktop PC, a tablet PC, and a notebook PC. Meanwhile, in FIG. 1, although the electronic apparatus 200 and the user terminal 300 are illustrated as a single apparatus, they may be implemented as a plurality of electronic apparatuses and a plurality of user terminals.

The server 100 may receive an authentication request from the user terminal 300. If the authentication request is received from the user terminal 300, the server 100 may transmit question information to the user terminal 300. For example, the question information may be "how many cups are on the table?", "how many people are in a frame on the wall?", or the like.

Further, the user terminal 300 may transmit first response information on the question information to the server 100 based on a user input responding to the received question.

Further, when the first response information is received from the user terminal 300, the server 100 may transmit the received first response information and the question information transmitted to the user terminal 300 to the electronic apparatus 200.

Further, when the question information and the first response information are received from the server 100, the electronic apparatus 200 may determine a confirmation result for the first response information.

For example, when the question information and the first response information are received, the electronic apparatus 200 may use an image to acquire context information of a location where the electronic apparatus 200 is located. At this point, the context information may be information on at least one object included in the location where the electronic apparatus 200 is located, for example, information on the cup on the table, the frame on the wall, etc. Meanwhile, the electronic apparatus 200 may use a camera to acquire context information of the location where the electronic apparatus 200 is located and use near-field wireless communication, or the like to receive an image or acquire information on peripheral devices.

Further, the electronic apparatus 200 may use the acquired context information to acquire second response information on the received question. For example, if the question information received from the server 100 is "how many cups are on the table?", the electronic apparatus 200 may acquire the second response information "the number of cups on the table is two".

Further, the electronic apparatus 200 may use the acquired context information to determine the confirmation result for the received first response information. Further, when the second response information acquired by the electronic apparatus 200 matches the first response information received from the server 100, the electronic apparatus 200 may transmit the matched result to the server 100. Further, when the second response information does not match the first response information, the electronic apparatus 200 may transmit the mismatched result to the server 100.

Further, when the confirmation result for the first response information is received from the electronic apparatus 200, the server 100 may determine whether or not the user terminal 300 is authenticated based on the received confirmation result.

For example, when the received confirmation results are matched, it may be determined whether or not the first response information matches correct answer information pre-stored in the server 100. If the first response information matches the pre-stored correct answer information, the server 100 may determine that the user terminal 300 is authenticated. Further, if the first response information does not match the pre-stored correct answer information, the server 100 may determine that the user terminal 300 is not authenticated.

Meanwhile, it is described that the server 100 determines whether or not the user terminal 300 is authenticated. However, it is possible to determine whether or not the user other than the user terminal is authenticated based on the above-mentioned example embodiment.

Figure 2:
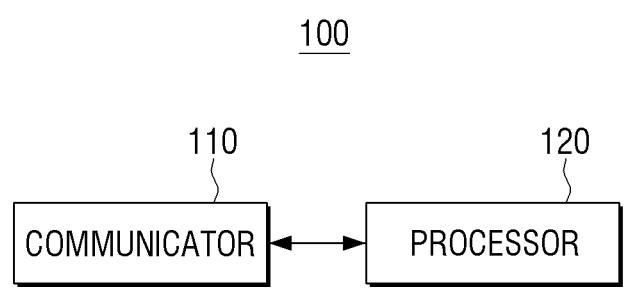
FIG. 2 is a block diagram illustrating an example configuration of a server according to an example embodiment of the present disclosure.

FIG. 2 is a block diagram illustrating an example configuration of the server 100 according to an example embodiment of the present disclosure. As illustrated in FIG. 2, the server 100 includes a communicator (e.g., including communication circuitry) 110 and a processor or controller (e.g., including processing circuitry) 120.

The communicator 110 may include various communication circuitry and communicates with the user terminal and the electronic apparatus. For example, the communicator 110 may receive the authentication request from the user terminal and transmit the question information. Further, the communicator 110 may transmit the question information and the response information to the electronic apparatus, and receive the confirmation result for the response information.

The processor 120 may include various processing circuitry and controls an overall operation of the server 100. For example, when the authentication request is received from a first user terminal 300 through the communicator 110, the processor 120 may control the communicator 110 to transmit the question information to the first user terminal 300. Further, if the first response information responding to the question information is received from the first user terminal 300 through the communicator 110, the processor 120 may control the communicator 110 to transmit the question information and the first response information to the external electronic apparatus 200. Further, when the confirmation result for the first response information is received from the electronic apparatus 200 through the communicator 110, the processor 120 may determine whether or not the first user terminal 300 is authenticated based on the confirmation result.

For example, when the authentication request is received from the first user terminal 300 through the communicator 110, the processor 120 may control the communicator 110 to transmit the question information to the first user terminal 300. At this point, the question information may be the pre-stored question from the user.

Further, if the first response information responding to the question information is received from the first user terminal 300 through the communicator 110, the processor 120 may control the communicator 110 to transmit the question information and the first response information to the external electronic apparatus 200.

Further, the processor 120 may control the communicator 110 to receive the confirmation result for the first response information from the electronic apparatus 200. In this case, the confirmation result of the first response information received from the electronic apparatus 200 may be a result of acquiring fourth response information on the question information using at least one of the image acquired by the electronic apparatus 200 or the image pre-stored in the electronic apparatus 200 and confirming whether the acquired fourth response information matches the received first response information. For example, when the fourth response information acquired by the electronic apparatus 200 matches the received first response information, the communicator 110 may receive the result of the match. Further, when the fourth response information acquired by the electronic apparatus 200 does not match the received first response information, the communicator 110 may receive the result of the mismatch.

Further, when the confirmation result for the first response information is received from the electronic apparatus 200 through the communicator 110, the processor 120 may determine whether or not the first user terminal 300 is authenticated based on the confirmation result.

For example, when the confirmation results for the first response information received through the communicator 110 are matched, the processor 120 may determine whether or not the first response information matches the correct answer stored in the storage (not illustrated). Further, if the first response information matches the stored correct answer, the processor 120 may determine that the first user terminal is authenticated.

At this point, the correct answer stored in the storage (not illustrated) may be the response pre-stored through a procedure of registering an authentication means. Specifically, when the question information and the second response information for the registration of the authentication means are received from the first user terminal through the communicator 110, the processor 120 may control the communicator 110 to transmit the received question information and second response information to the electronic apparatus 200.

Further, When the result of determining that the second response information corresponds to the question information is received from the electronic apparatus 110 through the communicator 110, the processor 120 may store the second response information in the storage (not illustrated) as the correct answer. Only when it is determined that the response to the question acquired by the electronic apparatus 200 and a response recognized by a user matches each other by the procedure of registering an authentication means described above, the received question information and second response information are used as the question and the correct answer for authentication.

Further, when the authentication request is received from a second user terminal (not shown) through the communicator 110, the processor 120 may control the communicator 110 to transmit the question information to the second user terminal. At this point, the user of the second user terminal may be the same group member as the user of the first user terminal 300.

Further, if third response information responding to the question information is received from the second user terminal through the communicator 110, the processor 120 may control the communicator 110 to transmit the question information and the received third response information to the electronic apparatus 200. At this point, the question information transmitted through the communicator 110 may be the question information received from the first user terminal 300.

Further, if it is determined that the second user terminal is authenticated, the processor 120 may control the communicator 110 to transmit whether the second user terminal is authenticated to the first user terminal 300.

By the server 100 as described above, the user may receive the authentication service reflecting context information of a specific location in real time.

Figure 3:
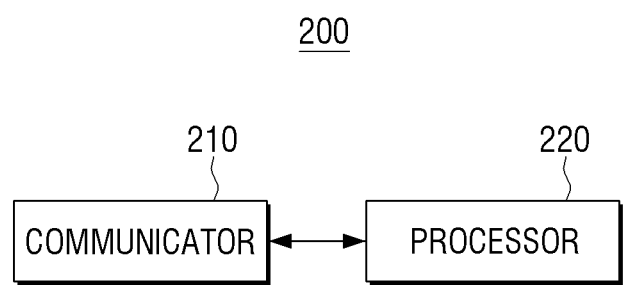
FIG. 3 is a block diagram illustrating an example configuration of an electronic apparatus according to an example embodiment of the present disclosure.

FIG. 3 is a block diagram illustrating an example configuration of the electronic apparatus 200 according to an example embodiment of the present disclosure. As illustrated in FIG. 3, the electronic apparatus 200 includes a communicator (e.g., including communication circuitry) 210 and a processor or controller (e.g., including processing circuitry) 220. Meanwhile, the electronic apparatus 200 according to the embodiment of the present disclosure may be implemented as various electronic apparatus such as, for example, and without limitation, a smart TV, a smart phone, a desktop PC, a tablet PC, and a notebook PC.

The communicator 210 may include various communication circuitry and communicates with the server 100. In particular, the communicator 210 may receive the question information and the response information for authenticating the user terminal 300 from the server 100. Further, the communicator 210 may transmit the confirmation result of the received response information to the server 100. Meanwhile, the case where the communicator 210 communicates with the server 100 is described by way of example. Therefore, the communicator 210 may communicate with the user terminal 300. Thus, the electronic apparatus 200 may authenticate the user of the user terminal 300 or the user terminal 300.

The processor 220 may include various processing circuitry that controls an overall operation of the electronic apparatus 200. In particular, when the first user terminal 300-1 requests authentication to the server 100, the processor 220 may control the communicator 210 to receive the question information and the first response information for authenticating the first user terminal 300-1 from the server 100.

Further, if the question information and the first response information are received through the communicator 210, the processor 220 may use an image to acquire the context information of the location where the electronic apparatus 200 is located. For example, the question information may be a question about features of objects like in the location, "how many cups are on the table?", "what color is the sofa?", or the like. Further, the context information may be, for example, information indicating that three cups are on the table, the color of the sofa is white, and the number of persons included in the frame on the wall is three.

Further, the processor 220 may use the acquired context information to acquire second response information on the question information. At this point, the second response information may be, for example, "the number of cups on the table is three.", "the sofa is white".

Further, the processor may determine the confirmation result for the first response information based on the acquired second response information. Further, the processor 220 may transmit the determined confirmation result to the server 100.

Figure 4:
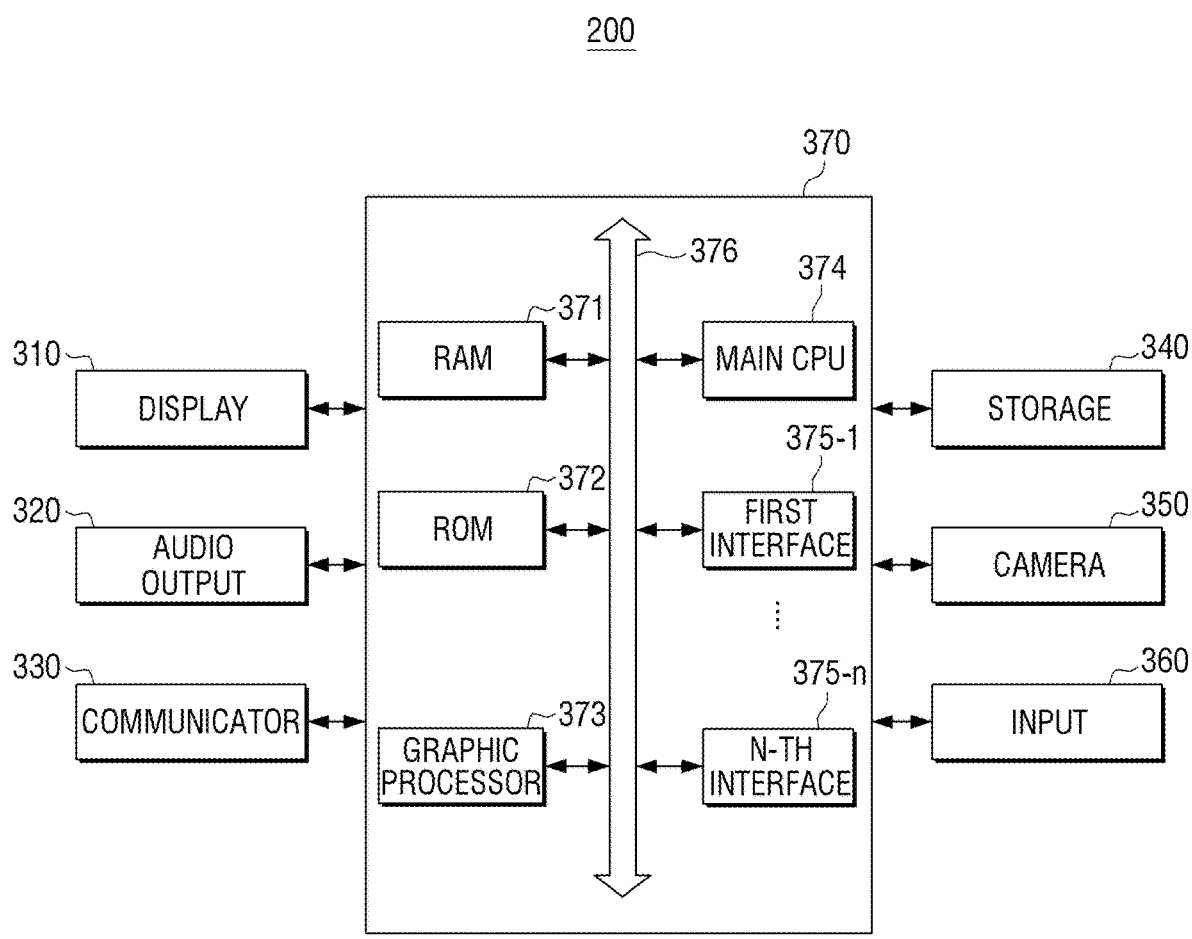
FIG. 4 is a block diagram illustrating an example configuration of the electronic apparatus according to the example embodiment of the present disclosure.

Hereinafter, various example embodiments of the present disclosure will be described with reference to FIGS. 4, 5, 6A and 6B. FIG. 4 is a block diagram illustrating an example configuration of the electronic apparatus 200 according to an example embodiment of the present disclosure. As illustrated in FIG. 4, the electronic apparatus 200 includes a display 310, an audio output (e.g., including audio output circuitry) 320, a communicator (e.g., including communication circuitry) 330, a storage 340, a camera 350, an input (e.g., including input circuitry) 360, and a processor (e.g., including processing circuitry) 370.

Meanwhile, FIG. 4 generally illustrates various components, by way of example, in the case where the electronic apparatus 200 is an apparatus including various functions such as question information and response information transmitting/receiving function, an image photographing function, and a display function. Therefore, according to an example embodiment of the present disclosure, some of the components illustrated in FIG. 4 may be omitted or changed and other components may also be added.

The display 310 displays image data received from an image receiver (not illustrated), at least one of a video frame which is processed image data by the video processor 180 and various screens generated from the graphic processor 373.

The audio output 320 may include various audio output circuitry and is configured to output various kinds of alarm sounds or voice messages in addition to various audio data on which various processing operations such as decoding, amplification, and noise filtering are performed by an audio processor (not illustrated). In particular, the audio output 320 may be may include various output circuitry, such as, for example, and without limitation, a speaker. Therefore, the audio output 320 may be implemented as an output terminal through which audio data may be output.

The communicator 330 may include various communication circuitry and is configured to perform communication with various types of external devices according to various types of communication schemes. The communicator 330 may include various communication chips such as, for example, and without limitation, a Wi-Fi chip, a Bluetooth chip, a near field communication (NFC) chip, a wireless communication chip, and the like. Here, the Wi-Fi chip, the Bluetooth chip, and the NFC chip perform communication in a Wi-Fi scheme, a Bluetooth scheme, an NFC scheme, respectively. Among those, the NFC chip means a chip operated in a near field communication (NFC) scheme using a band of 13.56 MHz among various RF-ID frequency bands such as 135 kHz, 13.56 MHz, 433 MHz, 860 to 960 MHz, and 2.45 GHz. In the case of using the Wi-Fi chip or the Bluetooth chip, various types of connection information such as an SSID and a session key is first transmitted and received to perform communication connection using the same, and then various types of information may be transmitted and received. The wireless communication chip means a chip performing communication depending on various communication protocols such as IEEE, Zigbee, 3rd generation, 3rd generation partnership project (3GPP), long term evolution (LTE), and the like.

In particular, the communicator 330 may receive the question information and the response information from the server 100, and may transmit the confirmation result for the response information to the server 100.

The storage 340 stores various modules for driving the electronic apparatus 200. For example, the storage 340 may store software including a base module, a sensing module, a communication module, a presentation module, a web browser module, and a service module. In this case, the base module is a basic module that processes signals transferred from each hardware included in the electronic apparatus 200 and transfers the processed signals to an upper layer module. The sensing module is a module collecting information from various sensors and analyzing and managing the collected information and may include a face recognizing module, an audio recognizing module, a motion recognizing module, an NFC recognizing module, and the like. The presentation module is a module for configuring a display screen and may include a multimedia module for playing and outputting multimedia contents and a UI rendering module for performing UI and graphic processing. The communication module is a module for performing communication with the outside. The web browser module is a module for performing web browsing to access a web server. The service module is a module including various applications for providing various services.

In particular, the storage 340 may store an image representing the location where the electronic apparatus 200 is located.

Meanwhile, according to the example embodiment of the present disclosure, the storage 340 may be defined as an ROM 372 and/or an RAM 371 within the processor 370 or a memory card (not illustrated) (for example, micro SD card, memory stick) equipped in the electronic apparatus 200.

The camera 350 photographs the surrounding locations. In particular, the camera 350 may photograph the location where the electronic apparatus 200 is located in real time.

The input 260 may include various circuitry and receive a user command for controlling the electronic apparatus 200. In particular, the input 260 may include various input circuitry, such as, for example, and without limitation, a touch input, a button, a voice input, a motion input, a keyboard, and a mouse to receive the user command.

The processor 370 may include various processing circuitry and controls the overall operation of the electronic apparatus 200 using various programs stored in the storage 340.

As illustrated inn FIG. 4, the processor 370 may include, for example, and without limitation, the RAM 371, the ROM 372, a graphic processor 373, a main CPU 374, first to n-th interfaces 375-1 to 375-*n*, and a bus 376. In this case, the RAM 371, the ROM 372, the graphic processor 373, the main CPU 374, the first to n-th interfaces 375-1 to 375-*n*, and the like may be connected to each other via the bus 376.

A set of commands for system booting, and the like is stored in the ROM 372. When a turn on command is input and thus power is input, the main CPU 374 copies an O/S stored in the storage 240 to the RAM 372 according to the command stored in the ROM 371 and executes the O/S to boot the system. When the booting is completed, the main CPU 374 copies various application programs stored in the storage 240 to the RAM 371 and executes copied application programs to the RAM 371 to execute various operations.

The graphic processor 373 uses an operator (not illustrated) and a renderer (not illustrated) to create a screen including various objects such as a pointer, an icon, an image, and a text. The operator uses the control command received from the input to operate attribute values, such as coordinate values, forms, sizes, and colors in which each object will be displayed according to a layout of the screen. The renderer generates a screen of various layouts including objects based on the attribute values that are operated by the operator. The screen generated by the renderer is displayed in a display region of the display 210.

The main CPU 374 accesses the storage 340 to perform booting using the O/S stored in the storage 340. Further, the main CPU 374 performs various operations using various programs, contents, data, and the like that are stored in the storage 340.

The first to n-th interfaces 375-1 to 375-*n* are connected to the foregoing various components. One of the interfaces may be a network interface which is connected to the external devices through a network.

In particular, when the first user terminal 300 requests authentication to the server 100, the processor 370 may control the communicator 330 to receive the question information and the first response information for authenticating the first user terminal 300 from the server 100. Further, the processor 370 may use the image to acquire the context information of the location where the electronic apparatus 200 is located and use the acquired context information to acquire the second response information on the question information. Further, the processor 370 may determine the confirmation result for the first response information based on the acquired second response information. Further, the processor 370 may control the communicator 330 to transmit the determined confirmation result to the server 100.

Specifically, if the question information and the first response information for authenticating the first user terminal 300 are received through the communicator 330, the processor 370 may use the image to acquire the context information of the location where the electronic apparatus 200 is located. Meanwhile, the case where the question information and the first response information for authenticating the first user terminal 300 are received through the communicator 330 is described by way of example, but the example embodiment of the present disclosure may also be applied to the case in which the question information and the third response information for authenticating the second user terminal (not shown) are received. Accordingly, not only the first user but also the second user may be authenticated by using the question information and the correct answer stored in the server 100 through the procedure of registering an authentication means by the first user.

Further, the processor 370 may use the image to acquire the context information of the location where the electronic apparatus 200 is located. The processor 370 may use the camera 350 to photograph the location where the electronic apparatus 200 is located in real time to thereby acquire the context information of the location or may also use the image pre-stored in the storage 340.

Figure 5:
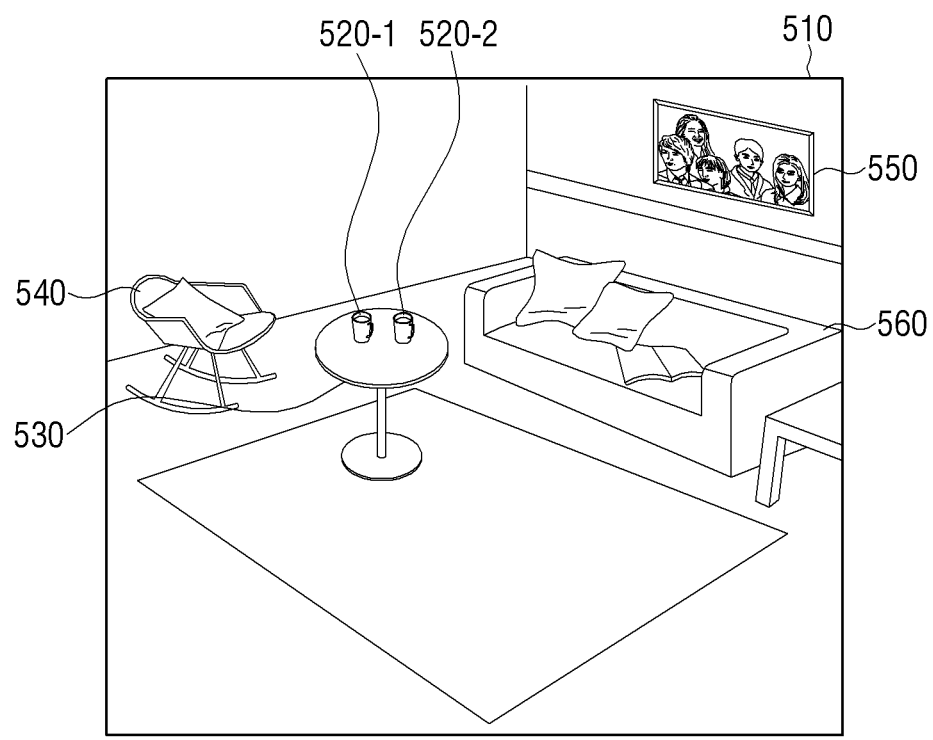
FIGS. 5, 6A and 6B are diagrams illustrating an example method for determining whether or not a user terminal is authenticated according to various example embodiments of the present disclosure.

For example, the processor 370 may use the camera 350 to photograph an image 510 as illustrated in FIG. 5 and acquire the context information. At this point, the context information may be information indicating that a chair 540, a table 530, a frame 550, and a sofa 560 are included in a space where the electronic apparatus 200 is located, two cups 520-1 and 520-2 are on the table 530, and three persons are included in the frame 550.

Meanwhile, FIG. 5 illustrates that the processor 370 uses the camera 350 to photograph the image. However, the processor 370 may use the image corresponding to the received question information among the images stored in the storage 340 to acquire the context information. Further, the processor 370 may update the image stored in the storage 340.

Further, the processor 370 may use the acquired context information of the location to acquire the second response information on the question information. At this point, the question information may include, for example, "how many cups 520-1 and 520-2 are on the table 530?", "what color is the sofa 560?", "how many people are included in the frame 550 on the wall?", and the like. Further, the second response information includes, for example, "the number of cups 520-1 and 520-2 on the table 530 are two", "the sofa 560 is white", and "the number of persons included in the frame 550 on the wall is three", and the like.

Further, the processor 370 may determine the confirmation result for the first response information based on the second response information and may control the communicator 330 to transmit the determined confirmation result to the server 100. Accordingly, the processor 370 may acquire the context information of the location, use the context information to determine the confirmation result for the received response information, and control the communicator 330 to transmit the determination result to the server 100.

If the question information stored in the server 100 and the correct answer corresponding thereto are changed, the authentication means may be changed. Alternatively, if the context information of the location where the electronic apparatus 200 is located is changed after the question information and the correct answer are stored in the server 100, the correct answer stored in the server 100 and the response information determined in the electronic apparatus 200 are different and thus the user terminal may not be authenticated, such that a procedure of changing the stored question information and the correct answer may be required. Accordingly, the processor 370 may determine whether or not the received response information corresponds to the question information to register the authentication means or change the authentication means.

Specifically, if the first user terminal 300 transmits the question information and the second response information for the registration of the authentication means to the server 100, the processor 370 receives the question information and the second response information through the communicator 330. Further, the processor 370 may use the acquired context information of the location to determine the confirmation result for whether the second response information corresponds to the question information.

Figure 6A:
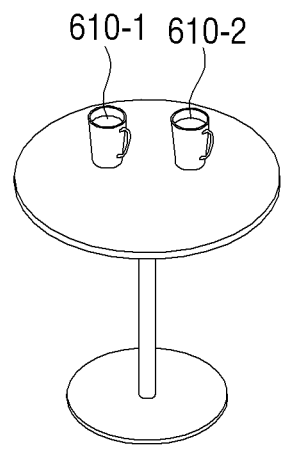
Figure 6B:
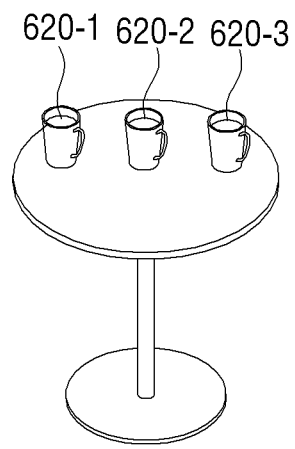

For example, as illustrated in FIGS. 6A and 6B, if the question information "how many cups are on the table" for the registration of the authentication means and the second response information "the number of cups on the table is two" are received from the server 100 through the communicator 330, the processor 370 may acquire the context information indicating that the number of cups 610-1 and 610-2 on the table of the location where the electronic apparatus 200 is located is two. Further, the processor 370 may use the acquired context information indicating that the number of cups 610-1 and 610-2 on the table is two to determine that "the number of cups on the table is two" corresponds to "how many cups are on the table?". Further, the processor 370 may control the communicator 330 to transmit the determination result that the second response information corresponds to the question information to the server 100 and the server 100 may store "the number of cups on the table is two" as the correct answer.

As another example, if the question information "how many cups are on the table" for the registration of the authentication means and the second response information "the number of cups on the table is two" are received from the server 100 through the communicator 330, the processor 370 may acquire the context information indicating that the number of cups 620-1, 620-2, and 620-3 on the table of the location where the electronic apparatus 200 is located is three. Further, the processor 370 may use the acquired context information indicating that the number of cups 620-1, 620-2, and 620-3 on the table is three to determine that "the number of cups on the table is two" does not correspond to "how many cups are on the table". Further, the processor 370 may control the communicator 330 to transmit the determination result that the second response information does not correspond to the question information to the server 100 and the server 100 may not register "the number of cups on the table is two" as the authentication means.

Figure 7:
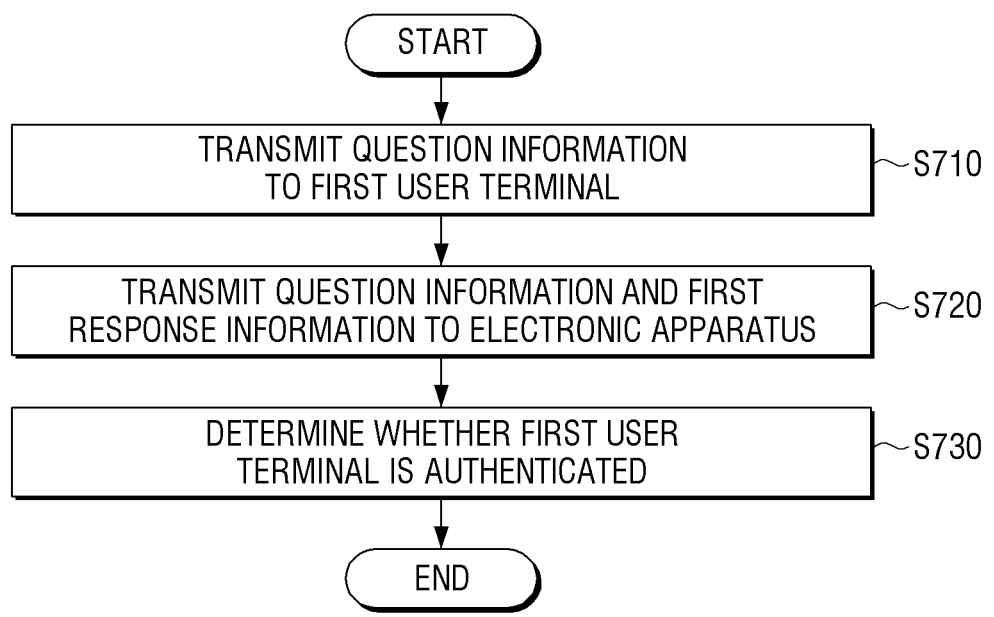
FIG. 7 is a flowchart illustrating an example method of operating a server according to an example embodiment of the present disclosure.

Hereinafter, a method of controlling a server 100 according to an example embodiment of the present disclosure will be described with reference to FIG. 7.

The server 100 transmits the question information to the first user terminal (S710). For example, if the authentication request is received from the first user terminal, the server 100 may transmit the question information for the authentication to the first user terminal.

Further, the server 100 transmits the question information and the first response information to the electronic apparatus (S720). For example, when the first response information responding to the question information is received from the first user terminal, the server 100 may transmit the question information and the response information to the electronic apparatus.

Further, the server 100 determines whether or not the first user terminal is authenticated (S730). Specifically, when the confirmation result for the first response information is received from the electronic apparatus 200, the server 100 may determine whether or not the first user terminal 1 is authenticated based on the received confirmation result.

Figure 8:
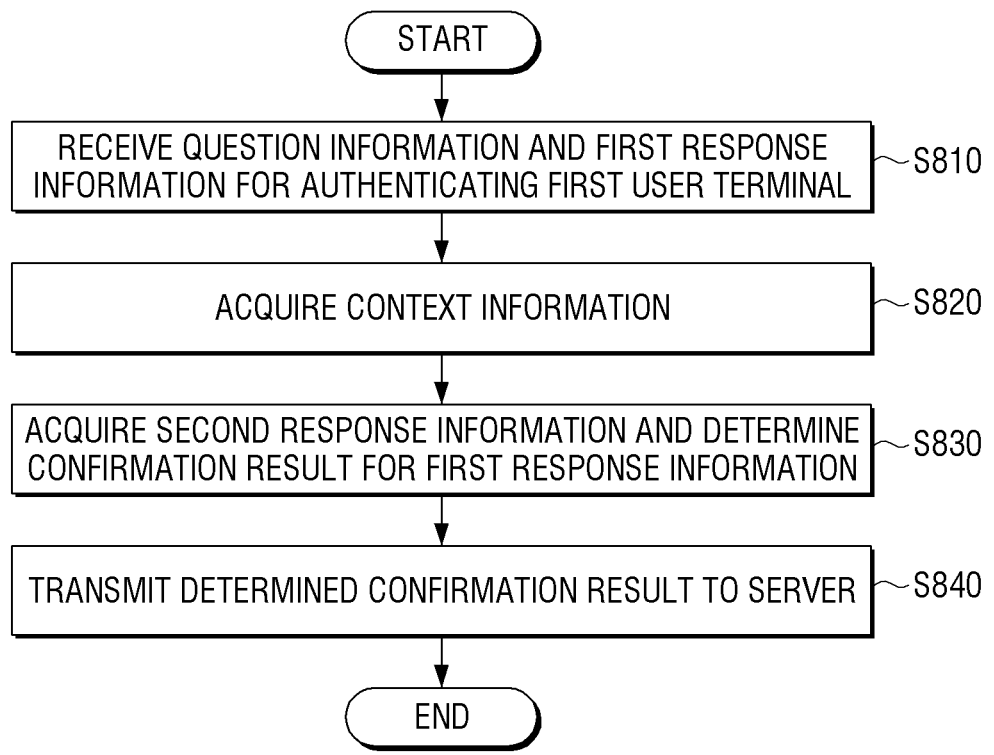
FIG. 8 is a flowchart illustrating an example method of operating an electronic apparatus according to an example embodiment of the present disclosure.

Hereinafter, a method of controlling the electronic apparatus 200 according to an example embodiment of the present disclosure will be described with reference to FIG. 8.

The electronic apparatus 200 receives the question information and the first response information for authenticating the first user terminal (S810). For example, when the first user terminal requests the authentication to the server, the electronic apparatus 200 may receive the question information and the first response information for authenticating the first user terminal from the server. In this case, the first response information may be the response information that is input from the first user terminal and is transmitted to the server.

Further, the electronic apparatus 200 acquires the context information of the location where the electronic apparatus 200 is included (S820). For example, the electronic apparatus 200 may use the camera to photograph the context information of the location where the electronic apparatus 200 is included in real time to thereby acquire the context information of the location where the electronic apparatus 200 is included and use the image pre-stored in the storage to acquire the context information of the location where the electronic apparatus 200 is included.

Further, the electronic apparatus 200 may acquire the second response information and determine the confirmation result for the first response information. For example, the electronic apparatus 200 may use the acquired context information of the location to acquire the second response information on the question information. Further, the electronic apparatus 200 may use the acquired second response information to determine the confirmation result for the first response information.

Further, the electronic apparatus 200 transmits the determined confirmation result to the server (S840).

Figure 9:
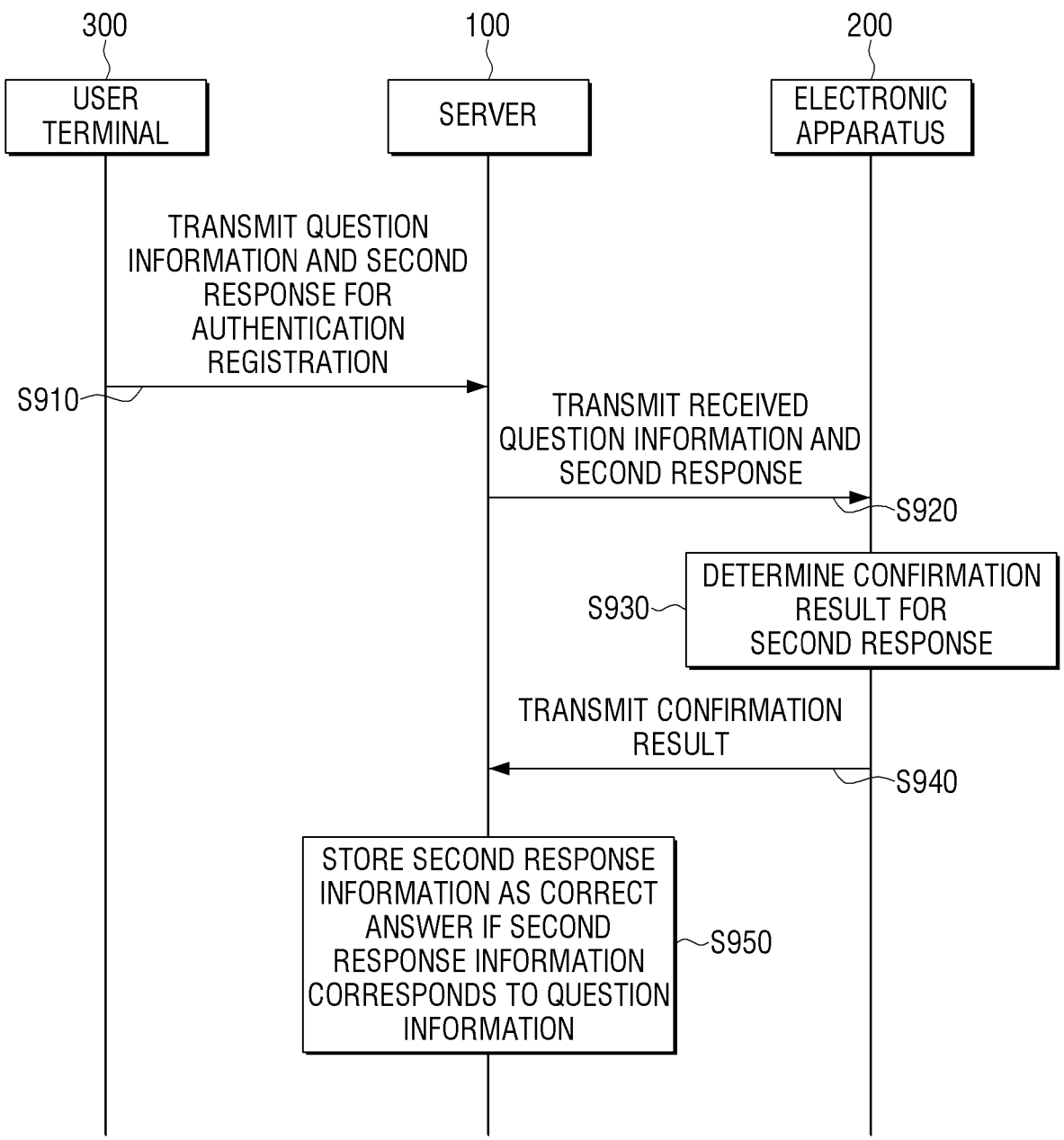
FIG. 9 is a sequence diagram illustrating an example method for registering an authentication means according to an example embodiment of the present disclosure.

FIG. 9 is a sequence diagram illustrating an example control method of a system for registering an authentication means according to an example embodiment of the present disclosure.

The user terminal 300 transmits the question information and the second response for the registration of the authentication means to the server 100 (S910). At this point, the question information for the registration of the authentication means may be information about a question that the user wants to register as the authentication means, and the second response may be a response corresponding to the question information that the user thinks.

Further, the server 100 transmits the received question information and the second response to the electronic apparatus 200 (S920).

Further, if the question information and the second response information are received from the server 100, the electronic apparatus 200 determines the confirmation result for the second response (S930). For example, the electronic apparatus 200 may acquire the context information of the location where the electronic apparatus 200 is located, and may use the acquired context information to determine whether or not the second response corresponds to the question information.

Further, the electronic apparatus 200 may transmit the determined confirmation result to the server 100 (S940).

Further, when the confirmation result is received from the electronic apparatus 200, the server 100 stores the second response information as a correct answer if the received confirmation result is that the second response information corresponds to the question information (S950).

As described above, the user may register the authentication means by reflecting whether or not the question information and the response information that the user wants to register as the authentication means are identically recognized even in the electronic apparatus as well.

Figure 10:
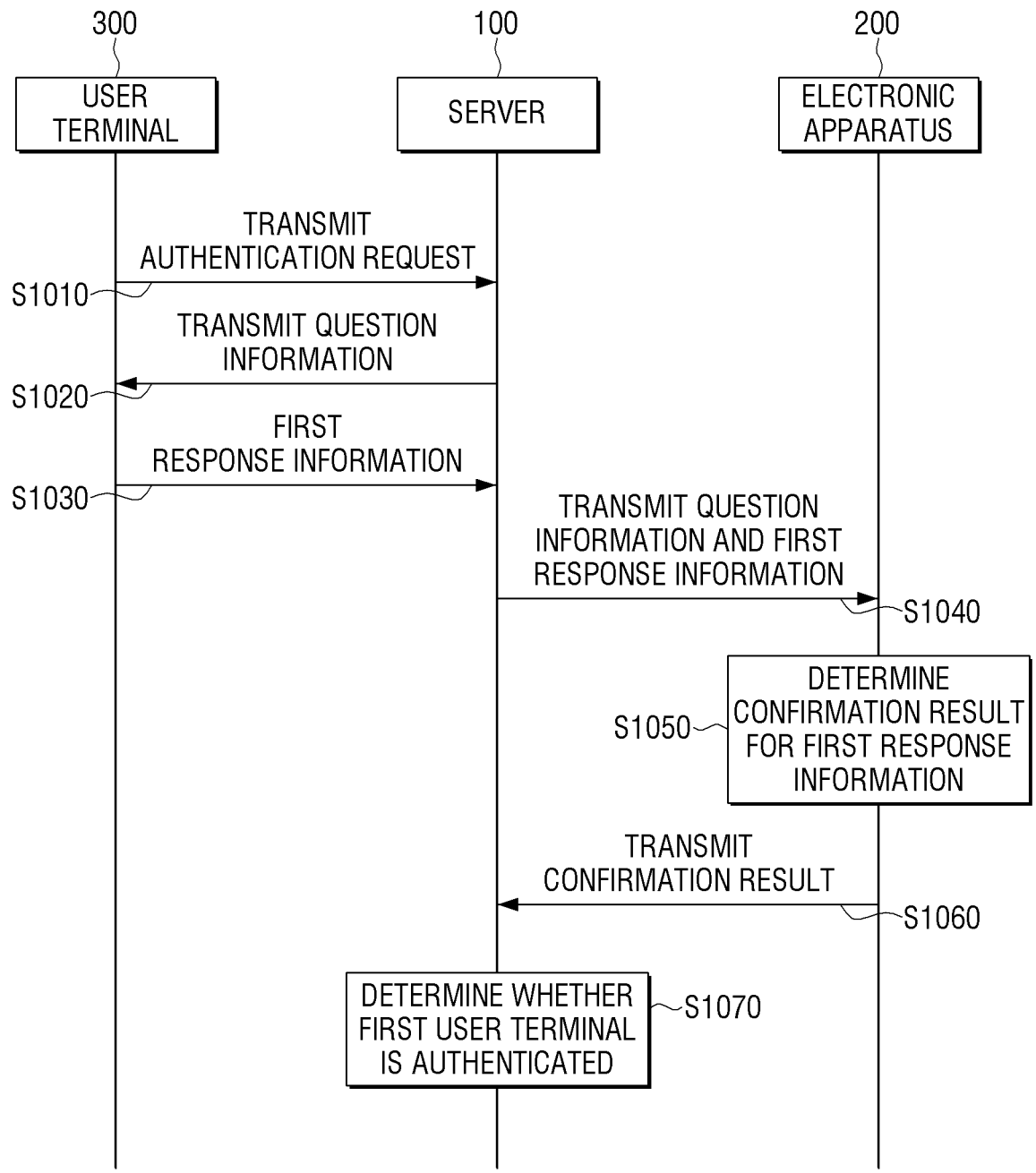
FIG. 10 is a sequence diagram illustrating an example method of operating an authentication system according to an example embodiment of the present disclosure.

FIG. 10 is a sequence diagram illustrating an example control method of a system for authentication according to an example embodiment of the present disclosure.

The user terminal 300 transmits the authentication request to the server 100 (S1010).

Further, the server 100 transmits the question information to the user terminal (S1020). The question information that the server 100 transmits to the user terminal 300 is the question information for authenticating the user or the user terminal 300 and may be the question information pre-stored through the registration of the authentication means.

Further, the user terminal 300 transmits the first response information to the server 100 (S1030). For example, the user terminal 300 may transmit the first response information to the server 100 in response to the question information received from the server 100.

Further, the server 100 transmits the question information and the first response information to the electronic apparatus (S1040).

Further, the electronic apparatus 200 determines the confirmation result for the first response information (S1050). For example, if the question information and the first response information are received from the server 100, the electronic apparatus 200 may use the image to acquire the context information of a location where the electronic apparatus 200 is located. At this point, the electronic apparatus 200 may also acquire the image by performing real-time photographing with the camera or may also use an image corresponding to the question information among the pre-stored images as an image.

Further, the electronic apparatus 200 may use the acquired context information to acquire the second response information. In this case, the second response information may be the response corresponding to the question information determined by the electronic apparatus 200. Further, the electronic apparatus 200 may determine the confirmation result for the first response information based on the acquired second response information.

Further, the electronic apparatus 200 transmits the determined confirmation result to the server 100 (S1060).

Further, the server 100 determines whether or not the first user terminal is authenticated (S1070). For example, when the confirmation result received from the electronic apparatus 200 is the determination result that the first response information matches the second response information, the server 100 may determine whether or not the first response information matches the correct answer. Further, if the first response information matches the correct answer, the server 100 may determine that the user terminal 300 is authenticated.

When the response information received from the user terminal 300 matches the response information acquired from the electronic apparatus 200 and the response information received from the user terminal 300 matches the correct answer stored in the server 100, it may be determined that the user terminal is authenticated.

According to the various example embodiments of the present disclosure as described above, the user may receive the authentication service having the higher-level security and may easily change the authentication means. For example, it is possible to provide the authentication service that may be authenticated only by a user who may access a specific location using the context information of the specific location as the authentication means.

Meanwhile, the above-described method may be implemented as a program that may be executed by a computer and may be implemented in a general-purpose digital computer that operates the program using a computer-readable recording medium. In addition, the structure of the data used in the above-described method may be recorded on a computer-readable recording medium by various means. The computer-readable recording medium includes storage media such as a magnetic storage medium (e.g., ROM, floppy disk, hard disk, etc.), optical reading medium (e.g., CD-ROM, DVD, etc.)

Those skilled in the art to which the present disclosure pertains will appreciate that the present disclosure may be implemented in a modified shape, without departing from the scope and spirit of the disclosure as defined in the accompanying claims. Therefore, the methods disclosed herein should be considered in an illustrative aspect rather than a restrictive aspect. The scope of the present disclosure should be defined by the following claims rather than the above-mentioned description, and all technical spirits equivalent to the following claims should be interpreted as being included in the present disclosure.

What is claimed is:

1. A method of operating a server, comprising:
receiving question information and first response information for the question information from a first user terminal, the question information comprising a question about at least one thing in a place where an electronic apparatus different from the first user terminal is located; and
transmitting the question information and the first response information to the electronic apparatus;
in response to receiving, from the electronic apparatus, a confirmation result that the first response information is matched with the question information based on context information of the place where the electronic apparatus is located, storing the first response information as a correct answer for the question information;
in response to receiving authentication requests from the first user terminal and a second user terminal, transmitting the question information to the first user terminal and the second user terminal;
in response to the question information, receiving second response information from the first user terminal and third response information from the second user terminal;
transmitting the question information, the second response information, and the third response information to the electronic apparatus;
determining whether the second and the third response information match the correct answer stored in the server in response to receiving, from the electronic apparatus, a confirmation result that the second and the third response information are matched with the question information based on the context information of the place where the electronic apparatus is located; and
authenticating the first user terminal and the second user terminal in response to the second and the third response information matching the correct answer stored in the server,
wherein the place where the electronic apparatus is located is different from a place where the first user terminal is located,
wherein the question information comprises the question about at least one of a color or a number of the at least one thing, and
wherein the context information comprises information on the at least one the color or the number of the at least one thing obtained from an image which captures the thing in the place where the electronic apparatus is located.

2. The method as claimed in claim 1, further comprising:
transmitting whether the second user terminal is authenticated to the first user terminal.

3. A server for authenticating user, the server comprising:
a communicator comprising communication circuitry;
a memory; and
a processor configured to:
receive question information and first response information for the question information from a first user terminal through the communicator, the question information comprising a question about at least one thing in a place where an electronic apparatus different from the first user terminal is located; and
control the communicator to transmit the question information and the first response information to the electronic apparatus;
in response to receiving, from the electronic apparatus through the communicator, a confirmation result that the first response information is matched with the question information based on context information of the place where the electronic apparatus is located, store the first response information as a correct answer for the question information in the memory;
in response to receiving authentication requests from the first user terminal and a second user terminal, control the communicator to transmit the question information to the first user terminal and the second user terminal, in response to the question information, receive second response information from the first user terminal, through the communicator, and third response information from the second user terminal, control the communicator to transmit the question information, the second response information, and the third response information to the electronic apparatus, determine whether the second and the third response information match the correct answer stored in the server in response to receipt, from the electronic apparatus, a confirmation result that the second and the third response information are matched with the question information based on the context information of the place where the electronic apparatus is located; and authenticate the first user terminal and the second user terminal in response to the second and the third response information matching the correct answer stored in the server, wherein the place where the electronic apparatus is located is different from a place where the first user terminal is located, wherein the question information comprises the question about at least one of a color or a number of the at least one thing, and wherein the context information comprises information on the at least one of the color or the number of the at least one thing obtained from an image which captures the thing in the place where the electronic apparatus is located.

4. The server as claimed in claim 3, wherein the processor is configured to control the communicator to transmit whether the second user terminal is authenticated to the first user terminal.

5. A method of operating an electronic apparatus, comprising:

receiving question information and first response information for the question information from a server, the question information comprising a question about at least one thing in a place where the electronic apparatus different from a first user terminal is located;

obtaining at least one context information of the place where the electronic apparatus is located using a first image which captures the at least one thing in the place where the electronic apparatus is located;

determining at least one confirmation result whether the first response information is matched with the question information based on the context information;

transmitting the confirmation result for the first response information to the server, receiving the question information, the second response information, and third response information from the server;

transmitting, from the electronic apparatus, a confirmation result that the second and the third response information are matched with the question information based on the context information of the place where the electronic apparatus is located, so that the server can determine whether the second and the third response information match the correct answer stored in the server and authenticate the first user terminal and the second user terminal in response to the second and the third response information matching the correct answer stored in the server;

wherein the place where the electronic apparatus is located is different from a place where the first user terminal is located, wherein the question information comprises the question about at least one of a color or a number of the at least one thing, and wherein the context information comprises information on the at least one of the color or the number of the at least one thing obtained from the first and second image which captures the thing in the place where the electronic apparatus is located.

* * * * *